US007274437B2

United States Patent
Kameyama et al.

(10) Patent No.: US 7,274,437 B2
(45) Date of Patent: Sep. 25, 2007

(54) LASER DETECTION AND RANGING APPARATUS

(75) Inventors: Shumpei Kameyama, Tokyo (JP); Yoshihito Hirano, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 359 days.

(21) Appl. No.: 10/510,983

(22) PCT Filed: Feb. 19, 2003

(86) PCT No.: PCT/JP03/01802

§ 371 (c)(1),
(2), (4) Date: Oct. 13, 2004

(87) PCT Pub. No.: WO2004/061476

PCT Pub. Date: Jul. 22, 2004

(65) Prior Publication Data

US 2005/0162637 A1    Jul. 28, 2005

(51) Int. Cl.
*G01C 3/08* (2006.01)
(52) U.S. Cl. .................. 356/4.07; 356/4.01; 356/4.1
(58) Field of Classification Search ............... 356/4.07; 346/4.07
See application file for complete search history.

(56) References Cited

U.S. PATENT DOCUMENTS

| 6,335,701 | B1 | 1/2002 | Fujisaka et al. | |
| 2005/0162637 | A1* | 7/2005 | Kameyama et al. | 356/4.01 |

FOREIGN PATENT DOCUMENTS

| JP | 42-8670 B1 * | 4/1967 |
| JP | 51-29032 A | 8/1976 |
| JP | 59-150299 A | 8/1984 |
| JP | 2-25786 A | 1/1990 |
| WO | WO-03/100458 A1 | 4/2003 |
| WO | WO-2004/061476 A1 | 7/2004 |

* cited by examiner

*Primary Examiner*—Thomas H. Tarcza
*Assistant Examiner*—Luke D. Ratcliffe
(74) *Attorney, Agent, or Firm*—Birch, Stewart, Kolasch & Birch, LLP

(57) ABSTRACT

In a laser detecting and ranging apparatus in which a light signal is intensity-modulated with a modulating frequency consisting of a frequency in the microwave band for thereby detecting a Doppler frequency relating to the modulating frequency, high reception sensitivity is realized.

The apparatus comprises a light transmitting unit for transmitting a light signal from a light source 1 as a transmitted beam L1 into the atmosphere, a light receiving means for receiving a light beam L2 from the atmosphere as a received light, an oscillator 10 for outputting a modulating signal having at least one modulating frequency as a carrier frequency, and a signal processing unit 12 for detecting properties of the atmosphere on the basis of the received light, wherein the light transmitting unit includes a light intensity modulator 2 for performing intensity modulation on the light signal from the light source 1 with the modulating signal, and wherein the signal receiving means includes an optical frequency conversion means 9 for converting the frequency of the intensity-modulated component of the received light to a base-band frequency, and an optical detection means 11 for directly detecting an output signal from the optical frequency conversion means 9 to thereby convert into an electric signal to be subsequently inputted to the signal processing unit 12.

3 Claims, 2 Drawing Sheets

LASER DETECTION AND RANGING APPARATUS

TECHNICAL FIELD

The present invention relates to a laser detecting and ranging apparatus for detecting or measuring properties of a light scattering object by transmitting and receiving a laser beam.

BACKGROUND TECHNIQUE

In the hitherto known or conventional laser detecting and ranging apparatus of the type mentioned above, a laser beam is emitted to the atmosphere as a transmitted beam, whereon the laser beam undergone a Doppler frequency shift due to a traveling or moving velocity of a light scattering object located at a beam focus is received. By performing a heterodyne detection on received light based on the received beam and local light, a Doppler signal is detected for determining the Doppler frequency and hence the moving velocity of the light scattering object.

In the conventional laser detecting and ranging apparatus described above, a system for detecting the Doppler shift frequency relating to the carrier frequency of light is adopted. However, with this system, coherency of the Doppler signal is low, as a result of which the time (coherent time) for which the phase of the light carrier undergone the Doppler shift is continuous is short, as is known in the art.

For example, it is known that in the case where the received beam is the scattered light from aerosol in the atmosphere, the coherent time of the Doppler signal is on the order of several microseconds. Accordingly, an attempt for improving the S/N (signal-to-noise) ratio by integrating the Doppler signal over an extended time will result in the impossibility of improving the S/N ratio by the coherent integration.

Further, in order to improve the S/N ratio, the Doppler signal has to be integrated incoherently, which will ultimately lead to the impossibility of enhancing the improvement efficiency of the S/N ratio as well.

In the conventional apparatus described above, as one of the causes for the coherent time of the Doppler signal being short, there can be mentioned the fact that the carrier frequency of light is high.

In this conjunction, in order to make available the Doppler signal of a long or extended coherent time, it is conceivable to modulate the intensity of a light signal with a modulating frequency lower than that of the light signal (e.g. modulating frequency in a microwave band) to thereby detect the Doppler frequency relating to this modulating frequency.

As the hitherto known apparatuses in which the system of intensity modulation of the light signal with the modulating frequency in the microwave band, as described above, has been adopted, there are known those which are disclosed in, for example, Patent Literature 1 (Japanese Patent Application Laid-Open No. 29032/1976), Patent Literature 2 (Japanese Patent Application Laid-Open No. 150299/1984) and Patent Literature 3 (Japanese Patent Application Laid-Open No. 25786/1990).

According to the conventional technologies disclosed in the Patent Literatures 1 to 3 mentioned above, direct detection with the aid of a photo-detector is adopted as a method of converting the received beam scattered by a scattering object into an electric signal.

Although the direct detection method such as mentioned above is advantageous over the heterodyne detection adopted in many laser detecting and ranging apparatuses known heretofore in that the reception sensitivity has no dependency on polarized electromagnetic radiation of the received beam, whereby stable reception sensitivity can be ensured, it is known that the reception sensitivity is low, to a disadvantage.

In particular, in the case where the scattering object, the object for detection, is aerosol in the atmosphere and where the traveling or moving velocity (wind velocity) of the aerosol is to be detected by receiving a feeble beam scattered from the aerosol, great difficulty has been encountered in realizing the desired reception sensitivity.

DISCLOSURE OF THE INVENTION

The present invention has been made with a view to solving to the problems mentioned above, and it is contemplated with the present invention to provide a laser detecting and ranging apparatus in which a light signal undergoes an intensity modulation with a modulating frequency consisting of a frequency in the microwave band for thereby detecting a Doppler frequency relating to the modulating frequency and which apparatus has no dependency on the polarized electromagnetic radiation of the received beam and thus can enjoy a sufficiently enhanced reception sensitivity.

BEST MODES FOR CARRYING OUT THE INVENTION

Embodiment 1

Figure 1:
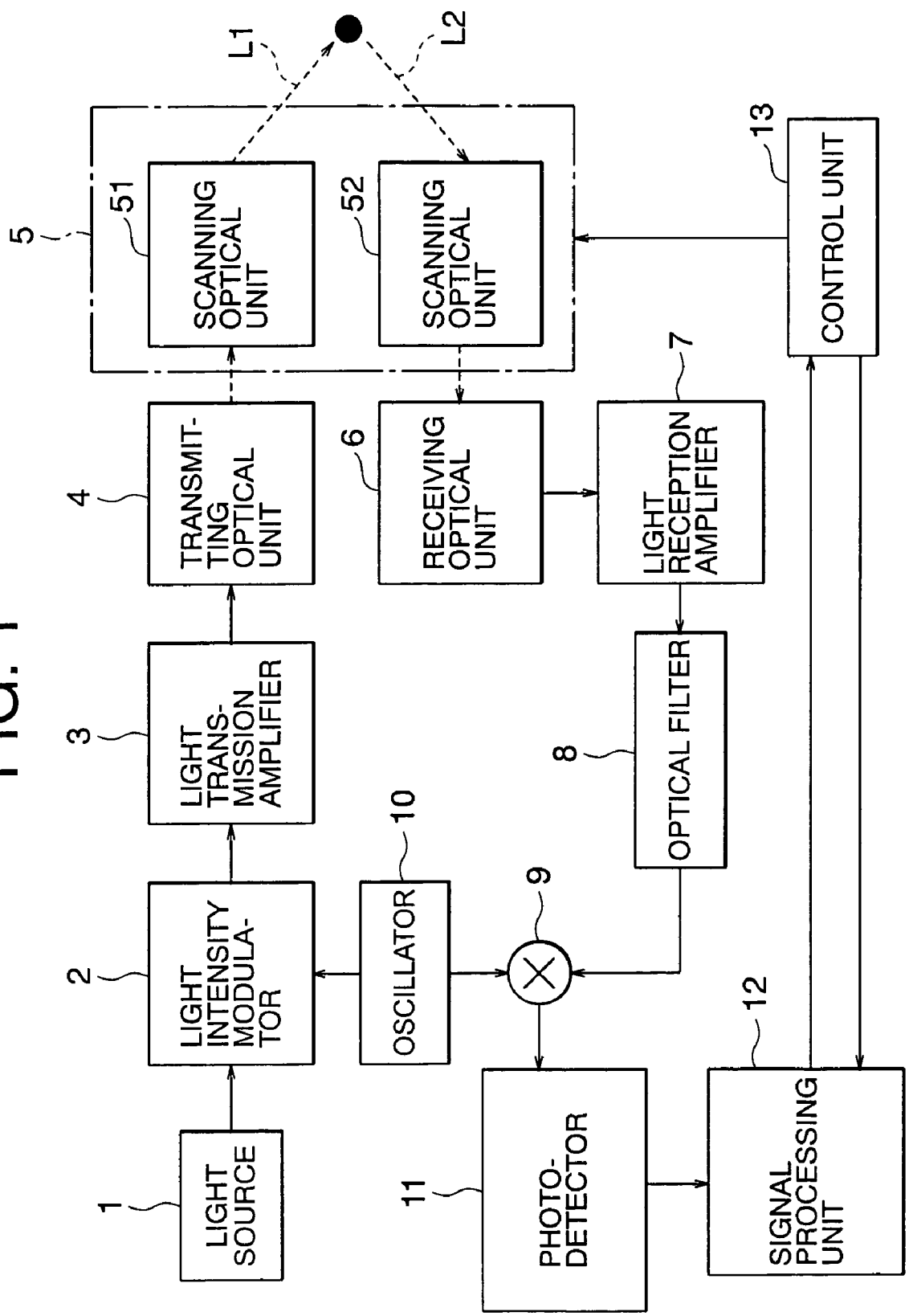
FIG. 1 is a block diagram showing a structure of the laser detecting and ranging apparatus according to a first embodiment of the present invention.

In the following, description will be made in detail of the laser detecting and ranging apparatus according to a first embodiment of the present invention (i.e., a first mode for carrying out the invention). FIG. 1 is a block diagram showing a structure of the laser detecting and ranging apparatus according to the first embodiment of the invention.

Referring to FIG. 1, the laser detecting and ranging apparatus includes as components of a transmitting system a light source 1, a light intensity modulator 2 for modulating intensity of light emitted from the light source 1, a light transmission amplifier 3 for amplifying the light beam undergone the modulation to a level for transmission, a transmitting optical unit 4 for transforming the amplified light beam to a light beam for transmission and a scanning optical unit 5.

The scanning optical unit 5 is composed of a transmission-destined scanning optical unit 51 and a reception-destined scanning optical unit 52 which are arrayed in parallel.

The transmission-destined scanning optical unit 51 emits a transmitted beam L1 while the reception-destined scanning optical unit 52 is designed to receive as a received beam L2 a light beam scattered from the focal point illuminated with the transmitted beam L1.

The light receiving system of the laser detecting and ranging apparatus includes a receiving optical unit 6 for receiving the received beam L2 through the medium of the scanning optical unit 52, a light reception amplifier 7 for amplifying the received signal, an optical filter 8 for selecting a desired reception frequency and an optical mixer 9 for mixing the reception frequency with a predetermined oscillation frequency.

The light intensity modulator 2 included in the transmission system and the optical mixer 9 included in the reception system are each supplied with an oscillation frequency signal from the oscillator 10.

A detection processing unit of the laser detecting and ranging apparatus is comprised of a photo-detector 10, a signal processing unit 12 for processing the detection signal outputted from the photo-detector 11 and a control unit for performing a final processing on the detection signal supplied through the medium of the signal processing unit 12.

The control unit 13 is designed to control the signal processing unit 12 for fetching the detection signal and perform a feedback control on the scanning optical units 51 and 52 in accordance with the detection signal.

As can be seen in FIG. 1, the light source 1 is connected to the light intensity modulator 2 which in turn is connected to the light transmission amplifier 3 and the oscillator 10, wherein the light transmission amplifier 3 is connected to the transmitting optical unit 4.

The receiving optical unit 6 is connected to the light reception amplifier 7 which is connected to the optical filter 8 which in turn is connected to the optical mixer 9.

The optical mixer 9 is connected to the photo-detector 11 and the oscillator 10 with the photo-detector 11 being connected to the signal processing unit 12. On the other hand, the control unit 13 is connected to the signal processing unit 12 and the scanning optical units 51 and 52.

At this juncture, it should be mentioned that the light source 1 and the light intensity modulator 2, the light intensity modulator 2 and the light transmission amplifier 3, and the light transmission amplifier 3 and the transmitting optical unit 4 are mutually coupled by optical fiber cables, respectively, although not shown in FIG. 1 in the concrete.

Similarly, the receiving optical unit 6 and the light reception amplifier 7, the light reception amplifier 7 and the optical filter 8, the optical filter 8 and the optical mixer 9, and the optical mixer 9 and the photo-detector 11 are also mutually coupled by optical fiber cables, respectively.

By using the optical fiber cables for light propagation in both the transmission system and the reception system, as mentioned above, the degree of freedom in disposing the individual elements internally of the laser detecting and ranging apparatus can significantly be enhanced when compared with the arrangement in which the light signals are caused to propagate in the space.

On the other hand, the other elements than those mentioned above are presumed to be mutually connected by using wiring cables.

The oscillator 10 for outputting an oscillation signal is so designed that at least one modulating frequency (described later on) is outputted as a carrier frequency. In that case, the oscillation signal is, for example, of a continuous waveform and used as a modulating signal.

In this case, the carrier frequency of the modulating signal outputted from the oscillator 10 is presumed to be a frequency (e.g. 2 GHz) in the microwave band used ordinarily in the electromagnetic Doppler radar. Obviously, this carrier frequency is of a remarkably low value when compared with the frequency of the light signal (e.g. 200 terahertz) sent from the light source 1.

The light intensity modulator 2 is designed to apply the intensity modulation to the light signal emitted from the light source 1 on the basis of the modulating signal outputted from the oscillator 10.

The transmitting optical unit 4 and the receiving optical unit 6 are so arranged as to form a focal point at a same location in the atmosphere through cooperation of the respective scanning optical units 51 and 52.

Figure 2:
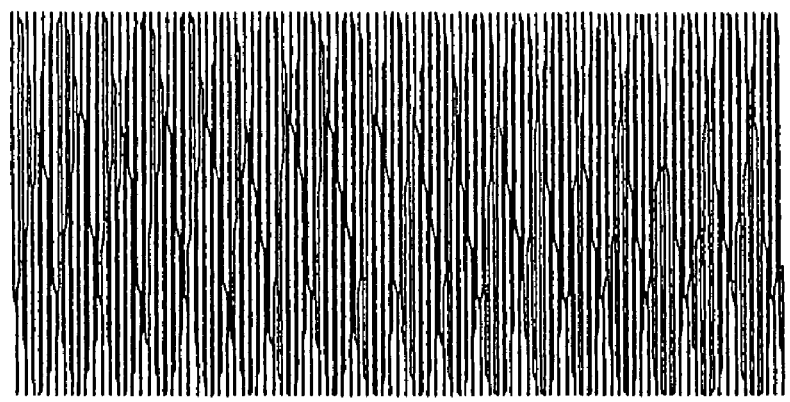
FIG. 2 is a waveform diagram for illustrating operation of the laser detecting and ranging apparatus according to the first embodiment of the invention and shows a light signal before being modulated.
Figure 3:
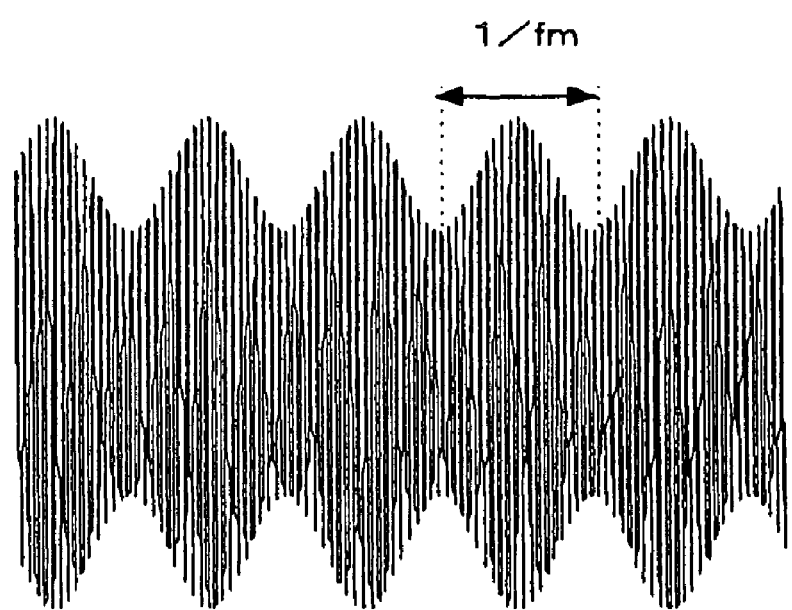
FIG. 3 is a waveform diagram for illustrating operation of the laser detecting and ranging apparatus according to the first embodiment of the invention and shows the light signal after having been modulated.

Next, referring to waveform diagrams shown in FIGS. 2 and 3, respectively, description will be directed to the operation of the laser detecting and ranging apparatus according to the first embodiment of the invention shown in FIG. 1.

By the way, in the description which follows, it is assumed that a scattering object is a mass of aerosol in the atmosphere and that the laser detecting and ranging apparatus shown in FIG. 1 is designed for detecting the wind velocity (i.e., for the traveling velocity detection of the aerosol) by determining the Doppler frequency of the wind velocity. It should however be appreciated that the teachings of the present invention can equally find other applications than the determination of the traveling velocity of the scattering object such as, for example, apparatus for measuring the traveling velocity of a motor vehicle and the like.

Further, with the phrase "received light", it is intended to mean a light signal based on the received beam L2 scattered by a target (at the focal point), the light signal being in the stage before undergoing the heterodyne detection or direct detection. Additionally, with the phrase "Doppler signal", it is intended to mean a signal whose carrier frequency represents the Doppler frequency relating to the traveling velocity of the scattering object.

At first, when the light signal of a continuous wave is sent out from a light source 1, the light intensity modulator performs the intensity modulation on this light signal.

FIGS. 2 and 3 illustrate the light signal waveforms, respectively, before and after the intensity modulation by the light intensity modulator 2.

The modulating frequency fm for the intensity modulation by the light intensity modulator 2 is the carrier frequency of the modulating signal generated by the oscillator 10.

The light signal undergone the intensity modulation by the light intensity modulator 2 is amplified by the light transmission amplifier 3. The light signal amplified by the light transmission amplifier 3 is emitted into the atmosphere as the transmitted beam L1 through the medium of the transmitting optical unit 4 and the scanning optical unit 51.

The transmitted beam L1 emitted into the atmosphere is received as the received beam L2 after having been reflected at the aerosol.

At this time point, the received beam L2 undergoes the Doppler frequency shift under the effect of the traveling velocity of the scattering object located at the focal point, i.e., under the influence of the wind velocity.

Since the light signal having the carrier frequency of light has been intensity-modulated by the modulating frequency fm of the microwave band, there exist two varieties of the Doppler frequency shifts, as mentioned below.

Namely, the first Doppler frequency shift bears relation to the carrier frequency of light while the second Doppler frequency shift bears relation to the modulating frequency fm.

In this conjunction, the Doppler frequency shift fsc relating to the carrier frequency of light can be given by the undermentioned expression (1):

$$fsc=(2v \times fc)/c \quad (1)$$

where fc represents the carrier frequency of light, c represents the propagation velocity of light and v represents the traveling velocity of the scattering object.

On the other hand, the Doppler frequency shift fsm relating to the modulating frequency fm (the carrier frequency of the modulating signal) is given by the following expression (2):

$$fsc=(2v \times fm)/c \quad (2)$$

Since the focal points of the beams L1 and L2 relevant to the transmitting optical unit 4 and the receiving optical unit 6, respectively, are set at the same position or location, as mentioned previously, the components scattered from the vicinity of the focal point are predominant in the received beam L2.

The received beam L2 having undergone the Doppler frequency shift fsm is supplied to the light reception amplifier 7 as the received light by way of the receiving optical unit 6 to be firstly amplified.

Subsequently, after elimination of unwanted frequency components by the optical filter 8, the amplified received light is supplied to the optical mixer 9.

The optical mixer 9 serves for mixing the oscillation signal delivered from the oscillator 10 with the received beam outputted from the optical filter 8. To say in another way, the optical mixer 9 modulates the light intensity of the received light with the oscillation signal outputted from the oscillator 10 (i.e., modulating frequency fm for the intensity of light for transmission).

In that case, the light intensity Imix of the received light having passed through the optical mixer 9 can be expressed as follows:

$$Imix=\{(Iin \cdot \cos(2\pi(fm+fsc))\} \cdot A \cos(2\pi fm) = A \cdot Iin/2\{\cos(2\pi(2fm+fsc))+\cos(2\pi fsc)\} \quad (3)$$

where Iin represents the received light intensity and A represents the modulated amplitude at the optical mixer 9.

In the above expression (3), no consideration is paid to the phase term. It should however be understood that not only the modulated amplitude A but also the phase, polarized light or the like may be modulated as occasion requires.

In this manner, as a result of the mixing performed by the optical mixer 9, there takes place in the light intensity Imix after passage through the optical mixer 9 frequency components corresponding to a difference and a sum between the frequency of the oscillation signal generated by the oscillator 10 and the frequency of the intensity-modulated component of the received light, respectively. Among them, the difference component represents the Doppler frequency relating to the modulating frequency fm.

In that case, the Doppler frequency relating to the modulating frequency fm is a product of the modulating frequency fm multiplied by 2v/c, as is obvious from the expression (2).

Needless to say, the propagation velocity c of light is of a far greater value than the traveling velocity v of the scattering object. Consequently, the Doppler frequency shift fsc relating to the modulating frequency fm is of a far lower base-band frequency when compared with the modulating frequency fm.

Incidentally, the phrase "base-band frequency" means a sufficiently lower frequency as compared with the modulating frequency fm.

By way of example, the frequency (2fm+fsc) appearing in the first parenthesized term of the right side in the expression (3) is out of the bandwidth of the base-band frequency, whereas the Doppler frequency shift fsc appearing in the second parenthesized form of the right side in the expression (3) is a base-band frequency.

As is apparent from the expression (3), any type of modulator can find application to the optical mixer 9 so far as the former is based on the operation principle that the intensity of light passing therethrough is modulated.

As the modulator of such type, there may be mentioned a Mach-Zehnder modulator which is so arranged that the incident light is optically divided to two light beam paths before phase-modulation with the modulating frequency fm, whereon the two branched light beams of different light path lengths are synthesized by making use of the electro-optical effect of an electrooptical crystal (or alternatively by resorting to the Franz-Keldysh effect of semiconductor, plasma effect or the like) to thereby modulate the passing light intensity by interference.

Alternatively, there may be employed an electro-absorption type modulator which is implemented such that a semiconductor having a band gap in the vicinity of the wavelength of the passing light is used to change the magnitude of the band gap by the modulating frequency fm inputted under the Franz-Keldysh effect to thereby modulate the absorption rate upon transmission of light therethrough.

On the other hand, by adopting the scheme of changing the amplification gain of a light amplifier by the modulating frequency fm, the modulated amplitude A appearing in the expression (3) becomes greater than "1", whereby amplification of the received light can be realized at the same time.

Furthermore, such a method may equally be adopted according to which the polarization direction of the passing light is polarization-modulated with the modulating frequency fm by making use of the electro-optical effect of an electrooptical crystal or the like and thereafter the polarization modulation is converted to the intensity modulation by passing through a polarizer.

Besides, a method may also be adopted in which the passing light is firstly phase-modulated with the modulating frequency fm (frequency modulation) by making use of the electro-optical effect of the electrooptical crystal, the Franz-Keldysh effect of semiconductor, the plasma effect or the like to be subsequently caused to pass through an optical frequency discrimination filter for thereby realizing the intensity modulation.

The output signal from the optical mixer 9 is supplied to the photo-detector 11 to be converted into an electric signal through direct detection.

In this conjunction, it should be added that by setting the frequency band of a front end circuit disposed at the output side of the photo-detector 11 to the base-band frequency band, it is possible to eliminate the carrier frequency of the light signal outputted from the optical mixer 9 through the direct detection by the photo-detector 11, as a result of which only the intensity-modulated component containing the Doppler frequency shift fsc is extracted.

Thus, the frequency of the electric signal outputted from the photo-detector 11 represents the Doppler frequency shift fsc relating to the modulating frequency fm. This Doppler frequency shift fsc corresponds to the wind velocity component in the receiving direction in the vicinity of the focal point of the transmitting optical unit 4 and the receiving optical unit 6.

As mentioned previously, the phrase "Doppler signal" means the signal whose frequency represents the Doppler frequency relating to the traveling velocity of the scattering object. Accordingly, in the description which follows, the electric signal acquired through the photo-detector 11 will also be referred to as the Doppler signal.

In general, the coherent time of the Doppler signal is in reverse proportion to the frequency of the transmitted signal. Consequently, the coherent time of the Doppler signal relating to the modulating frequency fm in the light intensity modulator 2 is far longer when compared with the coherent time of the Doppler signal relating to the carrier frequency of the light signal.

By way of example, in the case where the light signal having a frequency of 200 terahertz (wavelength of 1.5 μm) is intensity-modulated with the modulating frequency fm of 2 gigahertz, the coherent time of the Doppler signal relating to the modulating frequency fm is longer than the coherent time of the Doppler signal relating to the carrier frequency of the light signal by a factor on the order of $10^5$.

Incidentally, the carrier frequency of the modulating signal fm (modulating frequency) may be determined on the basis of the coherent time τγ as required and a constant k in accordance with the following expression:

$$fm = k/\tau\gamma.$$

In this conjunction, the typical value of the constant k may be set as mentioned bellow in consideration of the fact that the coherent time of the Doppler signal is on the order of 1 μsec for the frequency of 200 terahertz.

$$k = 2 \times 10^6$$

Subsequently, the signal processing of the Doppler signal is carried out by the signal processing unit 12, whereby the wind velocity is detected.

In that case, since the Doppler signal is detected by resorting to the direct detection with the aid of the photo-detector 11 for detecting the intensity-modulated component of the received light, variation of the polarized electromagnetic radiation in the light signal propagating through the optical fibers interconnecting the individual components or elements, even if it occur, would exert no influence to the reception sensitivity, whereby the measurement can be ensured with a stabilized reception sensitivity.

In conjunction with the direct detection by the photo-detector 11, the frequency band capable of being outputted from the photo-detector 11 is determined by transform impedance gain in the front end circuit of the photo-detector 11 and the capacity value of the photodiode incorporated in the photo-detector 11. Accordingly, when the transform impedance gain is set large, the frequency band which can be outputted is limited to a low-frequency range.

However, noise current i contained in the output signal of the photo-detector 11 is given by the undermentioned expression (4):

$$i = (4kTFB/R)^{1/2} \quad (4)$$

where k represents Boltzmann constant, F represents noise index of the front end circuit, B represents the frequency band of the output signal and R represents the transform impedance gain.

As can be seen in the expression (4), in the noise current i, thermal noise is predominant. Accordingly, in order to make smaller the noise current i, it is necessary to set large the transform impedance gain R.

By way of example, let's suppose that the received light is directly detected by the photo-detector 11 without using the optical mixer 9 as in the case of the hitherto known apparatus. In that case, for the output signal from the photo-detector 11, the frequency band on the order of the modulating frequency will be demanded. Consequently, it becomes impossible to set high the transform impedance gain R, making it difficult to decrease the noise current i.

By contrast, by converting lower the frequency of the intensity-modulated component of the received light by making use of the optical mixer 9 as in the case of the laser detecting and ranging apparatus shown in FIG. 1, the frequency band demanded for the output signal of the photo-detector 11 can be limited to the base-band frequency band.

As a consequence, the transform impedance gain R of the photo-detector 11 (i.e., resistance component of the transform impedance) can be set high, which in turn means that the reception sensitivity can be enhanced.

Further, in the structure of the laser detecting and ranging apparatus shown in FIG. 1, the carrier frequency of the transmitted signal is nothing but the carrier frequency of the light signal. Accordingly, merit or advantage of the laser detecting and ranging apparatus over the electromagnetic wave Doppler radar system can be sustained without fail. (For example, measurement can locally be performed with high spatial resolution.)

In the foregoing description, the frequency of the modulating signal (i.e., modulating frequency fm) inputted to the light intensity modulator 2 and that of the signal (i.e., modulating frequency fm) inputted to the optical mixer 9 are set to be equal to each other. In this conjunction, it should however be mentioned that by setting the modulating frequency inputted to the light intensity modulator 2 and the signal frequency inputted to the optical mixer 9 to the substantially same frequency with a small or slight difference being maintained therebetween, the desirable effect mentioned above can further be enhanced.

By way of example, by setting the signal frequency inputted to the optical mixer 9 to (fm+fb) for the modulating frequency fm inputted to the light intensity modulator 2 by using an optional frequency fb in the base-band frequency band, the output frequency of the photo-detector 11 is then given by fsc+fb.

In this manner, by adding the frequency offset to the Doppler frequency, it is possible to detect the Doppler frequency with higher S/N ratio while avoiding the influence of noise given by 1/f.

In this conjunction, in order to impart a slight difference (frequency fb) to between the modulating frequency fm inputted to the light intensity modulator 2 and the signal frequency (fm+fb) inputted to the optical mixer 9, another oscillator 10 (not shown) is additionally provided and the number of the oscillator 10 is increased to two so that the frequency signals having only a slight difference therebetween, i.e., frequency signals of approximately same frequency, may be supplied to the light intensity modulator 2 and the optical mixer 9 from the associated oscillators, respectively.

Further, although it has been mentioned that the transmitting optical unit 4 and the receiving optical unit 6 are provided separately, it is also conceivable to implement the transmitting optical unit 4 and the receiving optical unit 6 in an integral structure in the form of an optical transmitter/receiver unit and impart the optical transmitter/receiver unit with an optical circulator function. In that case, the position of focal point of the transmitted beam L1 in the transmission mode and the position of focal point of the received beam L2 in the reception mode approximately coincide with each other automatically, which contributes to further facilitated system implementation.

In the case of the laser detecting and ranging apparatus shown in FIG. 1, there are employed the light transmission amplifier 3, the light reception amplifier 7 and the optical filter 8. However, it can readily be appreciated that these elements may be spared so far as the measurement can be carried out with a sufficiently high reception sensitivity without resorting to the use of these elements.

Of course, in the case where the reception sensitivity for the received light is insufficient, at least one of the light transmission amplifier 3, the light reception amplifier 7 and the optical filter 8 may be provided to improve the reception sensitivity.

INDUSTRIAL APPLICABILITY

The present invention resides in the detection of the Doppler frequency relating to the frequency in the microwave band and can find application to all the systems relevant to the electromagnetic wave radar where the frequency in the microwave band is used such as typified by pulse system, FMCW system, etc.

The invention claimed is:

1. A laser detecting and ranging apparatus, comprising
   a light transmitting unit for transmitting a light signal from a light source as a transmitted beam into the atmosphere,
   a light receiving unit for receiving a light beam from the atmosphere as a received light,
   an oscillator for outputting a modulating signal having at least one modulating frequency as a carrier frequency, and
   a signal processing unit for detecting properties of said atmosphere on the basis of said received light,
   wherein said light transmitting unit includes a light intensity modulator for performing intensity modulation on the light signal from said light source with said modulating signal, and that
   said signal receiving means includes
      optical frequency conversion means for converting the frequency of the intensity-modulated component of said received light to a base-band frequency, and
      optical detection means for directly detecting an output signal from said optical frequency conversion means to thereby convert into an electric signal to be subsequently inputted to said signal processing unit.

2. A laser detecting and ranging apparatus set forth in claim 1, wherein said optical frequency conversion means is constituted by an optical mixer, and
   that said optical mixer is designed to modulate intensity of said received light with a modulating frequency which approximately equal to a carrier frequency of said modulating signal.

3. A laser detecting and ranging apparatus set forth in claim 2, wherein said optical mixer includes a light intensity modulator for modulating at least one of phase, polarization and amplitude of said received light with a modulating frequency which is approximately equal to a carrier frequency of said modulating signal.

* * * * *